No. 881,105. PATENTED MAR. 10, 1908.
T. E. BREYER.
APPARATUS FOR MAKING THIN BOILING STARCH.
APPLICATION FILED APR. 19, 1905.
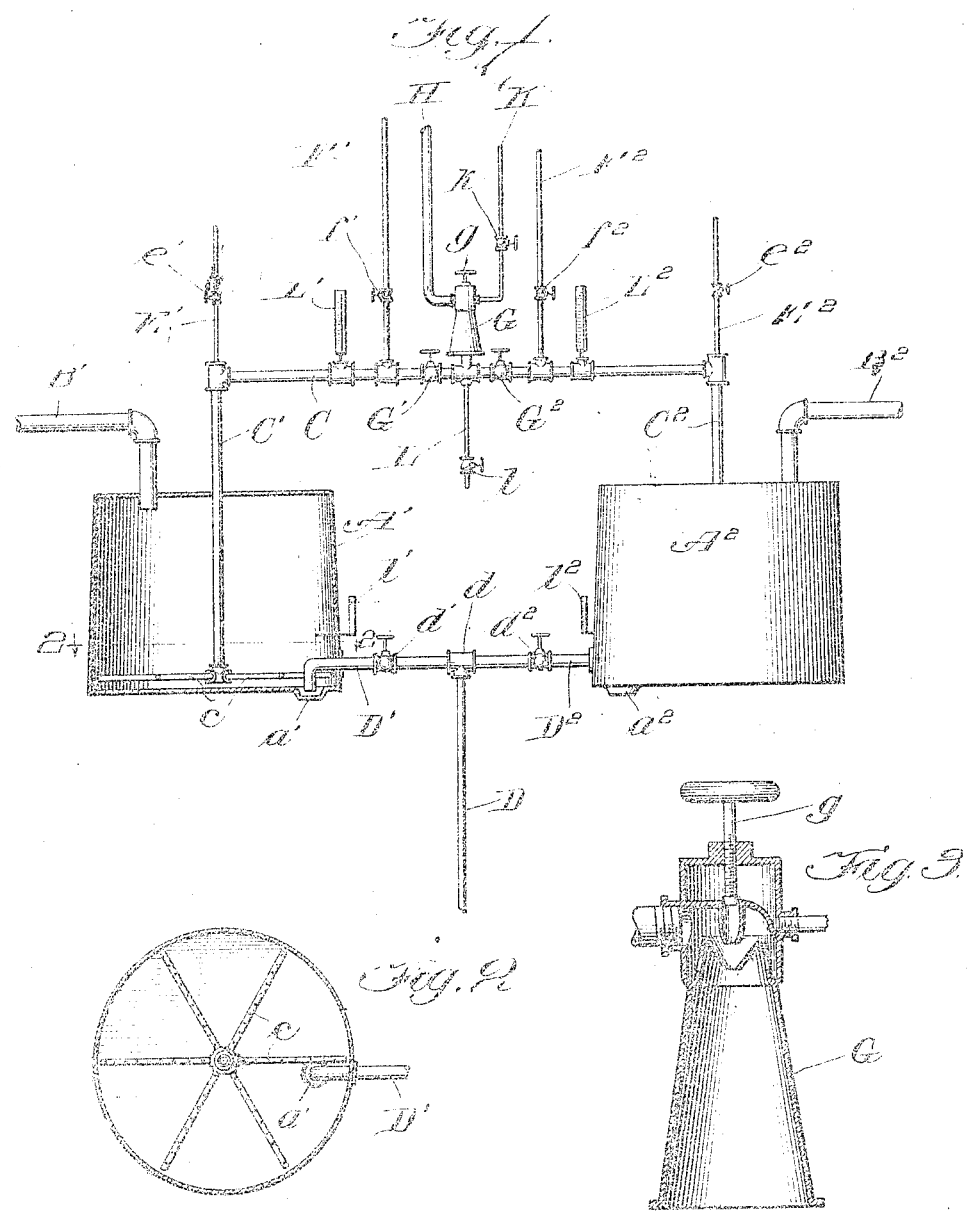

UNITED STATES PATENT OFFICE.

THEODOR E. BREYER, OF WAUKEGAN, ILLINOIS.

APPARATUS FOR MAKING THIN BOILING STARCH.

No. 881,105.  Specification of Letters Patent.  Patented March 10, 1908.

Application filed April 19, 1905. Serial No. 256,392.

*To all whom it may concern:*

Be it known that I, THEODOR E. BREYER, a citizen of the United States, residing at Waukegan, county of Lake, State of Illinois, have invented a certain new and useful Improvement in Apparatus for Making Thin Boiling Starch, and declare the following to be a full, clear, and exact description of the same, such as will enable others skilled in the art to which it pertains to make and use the same, reference being had to the accompanying drawings, which form a part of this specification.

My invention relates in general to the manufacture of starch, and more particularly to apparatus for making thin boiling starch.

In the manufacture of thin boiling or modified starch by the action of dilute acid upon ordinary starch, the time required may be considerably shortened by heating the mixture to a point near, but always below the temperature at which the starch becomes pasty. It is impossible to use steam as the medium for heating the starch milk owing to its temperature being too great, and it is also impracticable to employ heated air on account of the low heat capacity of gases. I have, however, discovered that a mixture of steam and air may be used to the best advantage and that by discharging the mixture through the starch milk no mechanical stirring device is necessary to keep the starch in suspension.

The primary object of my invention is to provide an apparatus for manufacturing thin boiling starch by means of which the starch milk may be heated to the requisite degree and the starch kept in suspension by discharging therethrough a mixture of steam and air until the required temperature has been obtained and then discharging air alone through the starch milk to keep the starch from settling.

A further object of my invention is to provide an apparatus for making thin boiling starch which will be simple in construction, inexpensive in manufacture, and efficient in use.

The apparatus in which I have disclosed my invention as embodied may be generally described as comprising two tanks into which the starch milk is pumped, conduits leading into said tanks and having perforated spiders at their lower ends, means for mixing steam and air in any desired proportions to produce a heating medium of proper degree, means for delivering any desired volume of the mixed steam and air into one or both of said conduits, and means for discharging air alone into said conduits to keep the starch in suspension after it has been heated to the proper degree.

My invention will be more fully described hereinafter with reference to the accompanying drawing in which the same is illustrated as embodied in a convenient and practical form, and in which,—

Figure 1 is an elevational view, one of the tanks being shown in vertical section; Fig. 2 a sectional view on line 2—2 Fig. 1; and Fig. 3 a detail sectional view of the steam jet.

The same reference characters are used to designate the same parts in the several figures of the drawing.

Reference characters $A'$ and $A^2$ designate two tanks of any suitable size, shape, and construction. $B'$ and $B^2$ designate pipes leading into the tanks $A'$ and $A^2$ and through which the starch, which has been previously broken into a heavy starch milk, is pumped.

$C'$ and $C^2$ designate vertical conduits extending downwardly within the tanks $A'$ and $A^2$ and terminating at their lower ends in spiders, such as shown in Fig. 2, composed of one or more perforated pipes $c$. The upper ends of the conduits $C'$ $C^2$ are connected to the horizontal conduit C. A steam jet device G of any suitable construction communicates with the horizontal conduit C preferably at a point intermediate of its ends. K is a steam pipe leading to the jet device G and provided with a controlling valve $k$.

H designates an air inlet pipe which leads to the steam jet device G. Leading downwardly from the horizontal conduit C is a pipe L having a cut-off valve $l$ therein through which water of condensation may be discharged.

Located in the conduit C are valves $G'$ and $G^2$ the former of which is located between the steam jet device G and the conduit $C'$ while the latter is located between the steam jet device and the conduit $C^2$.

$F'$ and $F^2$ designate vent pipes having controlling valves $f'$ & $f^2$ therein. The former of these vent pipes leads from the conduit C at a point intermediate of the valve G' and the conduit C', while the other of said vent pipes leads from a point in the conduit C' between the valve G² and the conduit C².

L' and L² designate thermometers located upon the conduit C intermediate of the points where the vent pipes F' and F² communicate with the conduit C, and C' and C² respectively.

E' and E² indicate pipes communicating with the upper ends of the conduit C' and C² respectively, such pipes being in communication with a source of compressed air. Valves e' and e² are provided in the pipes E' and E² for regulating the passageway therethrough.

D' and D² indicate conduits communicating with the interior of the tanks A' A² near the bottoms thereof and with which communicates a delivery conduit D through which the starch is pumped from the tanks and delivered to a filter press or similar device for removing the surplus water preparatory to drying the starch. Valves d', d² are provided in the conduits D' and D² for controlling the flow of starch from the respective tanks. The bottoms of the tanks are preferably provided with depressions a' a² into which the ends of the conduits D' D² extend thereby permitting the ends of the conduits to project below the bottoms of the tanks so that all of the starch may be drained from the tanks. Thermometers l' l² are preferably provided on the tanks A' A² to indicate the temperature of the starch.

The manner of using and operation of my improved apparatus are as follows: A heavy acidulated starch milk is pumped through the conduits B' B² into the tanks. The valve k is then turned so as to permit steam to pass through the pipe k into the steam jet device G where it is mixed with air drawn in through the inlet pipe H. The mixed air and steam then passes through the horizontal conduit C and conduit C' and C² to the bottoms of the tanks where it is discharged through the perforations in the tubes c communicating with the lower ends of the conduits. The mixed steam and air passing through the starch milk heats the same thereby promoting the conversion of the same into thin boiling or modified starch. The mixture of steam and air also serves to keep the starch in suspension thereby avoiding the necessity of providing mechanical stirring mechanism. The valve G' and G² permit either one or both of the tanks to be supplied with the mixed steam and air so that either tank alone may be used if desired. The valves f' f² are opened upon the first admission of steam and air to the conduit C so as to permit a portion of the mixture to escape and prevent the too rapid heating of the starch milk. By adjusting the position of the valves f' f² the temperature may be regulated by permitting a portion of the mixture to escape through the pipes F' F². The thermometers L' L² indicate the temperature of the mixture and serve as a guide for the regulation of the valves f' f².

As soon as the thermometers L' L² indicate that the starch milk has acquired the desired temperature the mixture of air and steam is shut off by closing the valves G' G². The valves e' e² are then opened admitting compressed air to the conduit C' C² which is discharged through the starch milk thereby preventing the settling of the starch. When the temperature of the starch milk in the tanks begins to fall the compressed air is shut off by closing the valves e' e² and the mixture of steam and air is again turned on by opening the valves G' G².

When it is ascertained by testing that the starch has acquired the desired property, it is removed from the tanks through the conduits D', D² and D by opening the valves d' d².

From the foregoing description it will be observed that I have invented an improved apparatus by means of which thin boiling starch may be conveniently and readily made and in which the desired heat is imparted to the starch milk and the starch kept in suspension by discharging through the same a mixture of steam and air of the proper temperature.

Having now fully described my invention, what I claim as new, and desire to secure by Letters Patent is:

1. In an apparatus for manufacturing thin boiling starch, the combination with a tank, of a conduit extending into and having a perforated portion adjacent the bottom of said tank, means for delivering mixed air and steam through said conduit to the interior of said tank, and means for delivering compressed air to said conduit.

2. In an apparatus for manufacturing thin boiling starch, the combination with a tank, of a conduit extending into and having a perforated portion adjacent the bottom of said tank, means for delivering mixed air and steam through said conduit to the interior of said tank, a pipe for conveying compressed air communicating with said conduit, and means for cutting off the delivery of mixed air and steam to said tank.

3. In an apparatus for manufacturing thin boiling starch, the combination with a tank, of a conduit extending into and having a perforated portion adjacent the bottom of said tank, a steam jet device communicating with said conduit for delivering a mixture of steam and air thereto, a pipe for conveying compressed air to said conduit, and a valve in said conduit intermediate of said steam jet device and said pipe.

4. In an apparatus for manufacturing thin boiling starch, the combination with a tank, of a conduit extending into and having a perforated portion adjacent the bottom of said tank, means for delivering mixed air and steam through said conduit to the interior of said tank, a vent pipe leading from said conduit, and a valve controlling the escape of the mixed air and steam from said pipe.

In testimony whereof, I sign this specification in the presence of two witnesses.

THEODOR E. BREYER.

Witnesses:
FRANK W. BRIDGES,
JAS. S. FLOOD.